(12) United States Patent
Bekiares et al.

(10) Patent No.: US 9,386,252 B2
(45) Date of Patent: Jul. 5, 2016

(54) SYSTEMS AND METHODS FOR TRIGGERING THE TRANSMISSION OF RECOVERY VIDEO FRAMES TO A VIDEO-RECEIVING DEVICE OVER A HALF-DUPLEX AIR INTERFACE

(71) Applicant: MOTOROLA SOLUTIONS, INC, Schaumburg, IL (US)

(72) Inventors: Tyrone D Bekiares, Park Ridge, IL (US); Mark Edwards, Reading (GB); Robert D. Logalbo, Rolling Meadows, IL (US); Steven D. Tine, Buffalo Grove, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 91 days.

(21) Appl. No.: 14/564,794

(22) Filed: Dec. 9, 2014

(65) Prior Publication Data
US 2016/0165168 A1 Jun. 9, 2016

(51) Int. Cl.
*H04N 5/38* (2006.01)
*H04N 19/176* (2014.01)
*H04L 5/16* (2006.01)

(52) U.S. Cl.
CPC .. *H04N 5/38* (2013.01); *H04L 5/16* (2013.01); *H04N 19/176* (2014.11)

(58) Field of Classification Search
CPC ........... H04N 5/38; H04N 19/176; H04L 5/16
USPC .................................................. 348/723, 725
See application file for complete search history.

(56) References Cited

U.S. PATENT DOCUMENTS

| | | | | |
|---|---|---|---|---|
| 6,980,520 B1 * | 12/2005 | Erimli | ...................... | H04L 47/10 370/236 |
| 7,065,582 B1 * | 6/2006 | Dwork | .................. | G06F 13/387 709/234 |
| 8,230,105 B2 | 7/2012 | Melnyk et al. | | |
| 8,472,358 B2 | 6/2013 | Torsner et al. | | |
| 2002/0087723 A1 * | 7/2002 | Williams | ............ | H04L 12/5602 709/240 |
| 2011/0030025 A1 | 2/2011 | Bertonis et al. | | |
| 2016/0062937 A1 * | 3/2016 | Huang | .................. | G06F 13/362 710/116 |

* cited by examiner

*Primary Examiner* — Trang U Tran

(57) ABSTRACT

An embodiment takes the form of a process that includes transmitting video frames to a receiving device during a first transmission period of one or more time slots of a half-duplex air interface, and receiving feedback messaging from the receiving device during a feedback period of one or more time slots of the half-duplex air interface. The process further includes suspending, after the first transmission period, transmission of video frames for a suspension period of one or more time slots of the half-duplex air interface, and after the feedback period and after the suspension period, transmitting one or more recovery frames to the receiving device during a recovery period of one or more time slots of the half-duplex air interface. The one or more recovery frames collectively include inter-coded macroblock data and/or intra-coded macroblock data.

20 Claims, 7 Drawing Sheets

SYSTEMS AND METHODS FOR TRIGGERING THE TRANSMISSION OF RECOVERY VIDEO FRAMES TO A VIDEO-RECEIVING DEVICE OVER A HALF-DUPLEX AIR INTERFACE

BACKGROUND OF THE INVENTION

Video is increasingly being used as a media for communication. Transmission of video media often involves traversal across one or more wireless links. Certain wireless links support only a half-duplex mode of communication, wherein only one side of the communication link can transmit at any given time.

The visual quality of a video stream that is transmitted over a half-duplex wireless link can become degraded if both sides of the link attempt to transmit data simultaneously. In such instances, it is often the case that one or more full or partial video frames are lost. Devices that display the video stream may be unable to present those non-received or partially-received video frames, thus causing stutter in the video stream from the perspective of a viewing user. Additionally, due to dependencies in the video encoding, the quality of individual video frames that are received and presented by the receiving device may be degraded if any of those received frames reference any of the non-received or partially-received video frames. Accordingly, there is a need for systems and methods for triggering the transmission of recovery video frames to a video-receiving device over a half-duplex air interface (i.e., when the video traverses one or more half-duplex wireless links).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
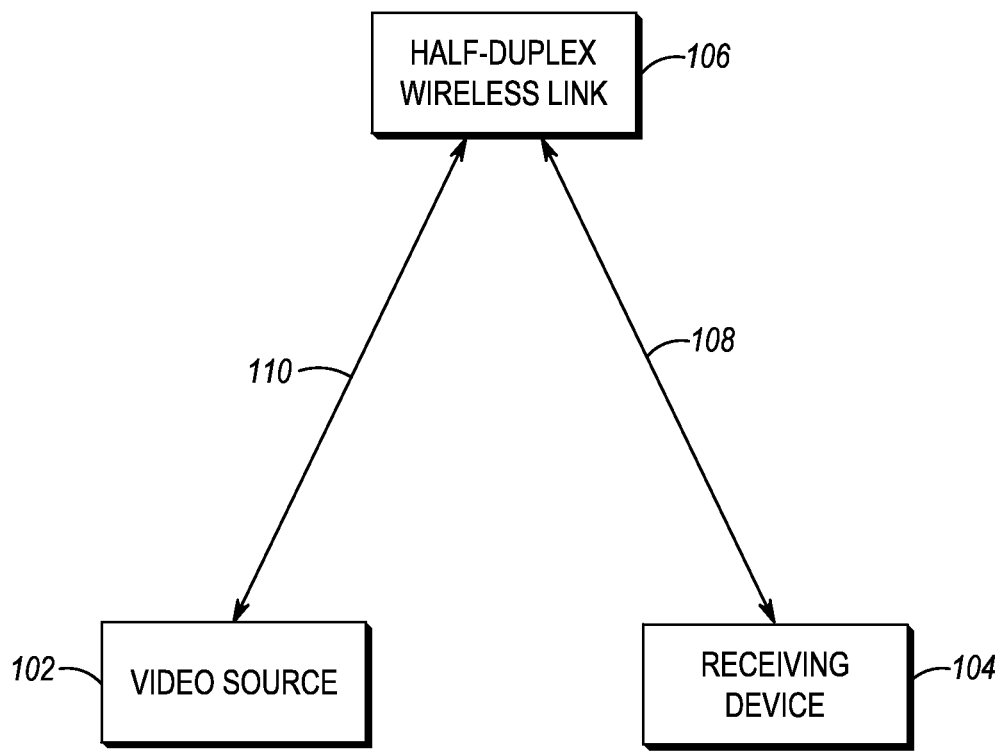
FIG. 1 depicts a communication system, in accordance with at least one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are systems and methods for triggering the transmission of recovery video frames to a video-receiving device over a half-duplex air interface (i.e., when the video traverses one or more half-duplex wireless links). An embodiment takes the form of a process that includes transmitting video frames to a receiving device during a first transmission period of one or more time slots of a half-duplex air interface, and receiving feedback messaging from the receiving device during a feedback period of one or more time slots of the half-duplex air interface. The process further includes suspending, after the first transmission period, transmission of video frames for a suspension period of one or more time slots of the half-duplex air interface, and after the feedback period and after the suspension period, transmitting one or more recovery frames to the receiving device during a recovery period of one or more time slots of the half-duplex air interface. The one or more recovery frames collectively take the form of (or include) one or both of (i) inter-coded macroblock data referencing data pertaining to a video frame transmitted during the first transmission period and (ii) intra-coded macroblock data.

An embodiment takes the form of a system that includes a video encoder, a communication interface, a processor, and data storage containing instructions executable by the processor for causing the system to carry out at least the functions described in the preceding paragraph. Moreover, any of the variations and permutations described in the ensuing paragraphs and anywhere else in this disclosure can be implemented with respect to any embodiments, including with respect to any method embodiments and with respect to any system embodiments.

In at least one embodiment, the feedback messaging is asynchronous feedback messaging and the feedback period is unscheduled.

In at least one such embodiment, the asynchronous feedback messaging takes the form of (or includes) one or more pan-tilt-zoom (PTZ) commands.

In at least one other such embodiment, the feedback period occurs during the first transmission period. In at least one such embodiment, suspending transmission of video frames for the suspension period includes suspending transmission of video frames for the suspension period in response to receiving the feedback messaging from the receiving device during the feedback period.

In at least one other such embodiment, the feedback period occurs after the first transmission period.

In at least one embodiment, the feedback messaging is synchronous feedback messaging and the feedback period is scheduled to occur after the first transmission period and during the suspension period.

In at least one such embodiment, the synchronous feedback messaging takes the form of (or includes) one or more adaptive bit rate (ABR) feedback messages. In at least one other such embodiment, the synchronous feedback messaging takes the form of (or includes) one or more session keep-alive messages. In at least one other such embodiment, a schedule of the feedback period is advertised to receiving devices.

In at least one embodiment, each video frame transmitted during the first transmission period corresponds to encoding a respective frame from a source video stream, and suspending transmission of video frames for the suspension period includes skipping encoding one or more frames from the source video stream.

In at least one embodiment, the one or more recovery frames collectively comprise inter-coded macroblock data referencing data pertaining to one or more of the video frames transmitted during the first transmission period.

In at least one such embodiment, the one or more recovery frames collectively comprise intra-coded macroblock data.

In at least one other such embodiment, the process further includes storing a last-known good video frame from among the video frames transmitted to the receiving device during the first transmission period. The reference data pertaining to one or more of the video frames transmitted during the first transmission period takes the form of (or includes) reference data pertaining to the last-known good video frame.

In at least one such embodiment, the process further includes transmitting one or more pre-suspension video frames to the receiving device after storing the last-known good video frame but before suspending transmission of video frames for the suspension period. In at least one such embodiment, each of the one or more pre-suspension video frames references a respective immediately preceding video frame. In at least one other such embodiment, each of the one or more pre-suspension video frames references the last-known good video frame.

In at least one embodiment, the one or more recovery frames collectively comprise intra-coded macroblock data. In at least one such embodiment, the one or more recovery frames consist of a single intra-coded video frame. In at least one other such embodiment, the one or more recovery frames comprise multiple recovery frames that include respective different intra-coded macroblock regions.

FIG. 1 depicts a communication system, in accordance with at least one embodiment. As shown, communication system 100 includes a video source 102, a receiving device 104, a half-duplex wireless link 106, communication link 108, and a communication link 110. And although they are not explicitly depicted in FIG. 1, the half-duplex wireless link 106 is made up of an uplink and a downlink, only one of which is usable for communication at any given time. In the present disclosure, communication from video source 102 to receiving device 104 is considered to traverse the downlink of the half-duplex wireless link 106, whereas communication from receiving device 104 to video source 102 is considered to traverse the uplink of the half-duplex wireless link 106; these designations are a choice of convention, made for illustration and not by way of limitation. Those of skill in the art will appreciate that system 100 may include different and/or additional elements.

Video source 102 may be any suitable computing and communication device (or combination of devices) equipped, programmed, and configured to carry out the video-source functions described herein, including those functions described below in connection with FIG. 4. Video source 102 may function to transmit a video stream to receiving device 104 and/or receive feedback messaging with respect to the video stream from receiving device 104, among numerous other possibilities. Video source 102 may receive the video stream from another entity communicatively connected to video source 102 via a communication link, and/or may obtain the video stream from a data storage of the video source, as just a couple of examples.

The video stream could be a live stream (e.g., that is captured by a surveillance camera, or perhaps by a light-pole-mounted camera having an embedded modem, as just a few examples) and/or a pre-recorded stream, among other variations. The video source 102 could take the form of a surveillance camera, a Network Video Recorder (NVR), a Video Management System (VMS), a desktop computer, a server, a notebook computer, a smartphone, and/or a tablet computer, among numerous other possibilities that will be apparent to those of skill in the art. It should be understood that, even though FIG. 1 depicts a single video source 102, system 100 could include multiple video sources configured to act independently of each other and/or in coordination with each other. In the depicted embodiment, video source 102 transmits a video stream to receiving device 104 (and receives feedback messaging from receiving device 104) via a communication path that includes the communication link 110, the half-duplex wireless link 106, and the communication link 108. This communication path is further discussed below.

Receiving device 104 may be any suitable computing and communication device (or combination of devices) equipped, programmed, and configured to carry out the receiving-device functions described herein, such as but not limited to receiving one or more video streams and transmitting feedback messaging to video source 102. In various different embodiments, receiving device 104 may record (i.e., store) received video, analyze received video, present received video via one or more user interfaces, and/or carry out one or more other video-receiver functions deemed suitable by those of skill in the relevant art for a given context. As examples, receiving device 104 could be or include a digital video recorder (DVR), an NVR, a VMS, a mobile device, smart phone, laptop computer, tablet computer, server, and/or any other video-receiver device deemed suitable by those of skill in the relevant art for a given context.

As described above, in at least one embodiment, video source 102 and receiving device 104 communicate over a communication path that is made up of the communication link 110 (between video source 102 and half-duplex wireless link 106), half-duplex wireless link 106 (between communication link 110 and communication link 108), and communication link 108 (between half-duplex wireless link 106 and receiving device 104. In various different embodiments, one or both of communication links 108 and 110 may include one or more operatively coupled base stations, routers, gateways, and/or other network elements. It is contemplated that, in various different embodiments, one or both of communication links 108 and 110 could be merged with half-duplex wireless link 106, such that either or both of video source 102 and receiving device 104 may communicate directly over half-duplex wireless link 106.

In some embodiments, one or both of communication links 108 and 110 include one or more wired-communication links (e.g., one or more Ethernet connections, one or more Universal Serial Bus (USB) connections, and/or the like) and/or one or more wireless-communication links (e.g., one or more wireless local area network (WLAN) (e.g., Wi-Fi) links, one or more wireless wide area network (WWAN) (e.g., Long Term Evolution (LTE)) links, and/or the like). It is also possible that one or both of communication links 108 and 110 themselves include one or more half-duplex wireless communication links separate and distinct from half-duplex wireless link 106. Moreover, one or both of communication links 108 and 110 may include one or more communication networks of any type deemed suitable by those of skill in the relevant art for a given context. And certainly numerous other configurations are possible as well.

Half-duplex air interface 106 may function such that only uplink communication or only downlink communication may be possible over the air interface at any given time. Half-duplex air interface 106 may include one or more air-interface channels, at least one of which is used for both uplink and downlink communication. Communication over a given channel may be addressed to a single receiving device using an identifier uniquely associated with that single receiving device and/or to multiple receiving devices. A given air-interface channel could be modulated using Frequency Modulation (FM), Quadrature Phase-Shift Keying (QPSK), and/or Quadrature Amplitude Modulation (QAM), among numerous other examples known to those of skill in the relevant art. In various different embodiments, the half-duplex wireless link 106 may take forms such as an 802.11 communication link, a 3GPP ProSe communication link, a TETRA Enhanced Data Service (TEDS) communication link, a TETRA Multi-Slot Packet Data (MSPD) link, a P25 High Speed Data (HSD) link, or any other half-duplex data communication link.

Figure 2:
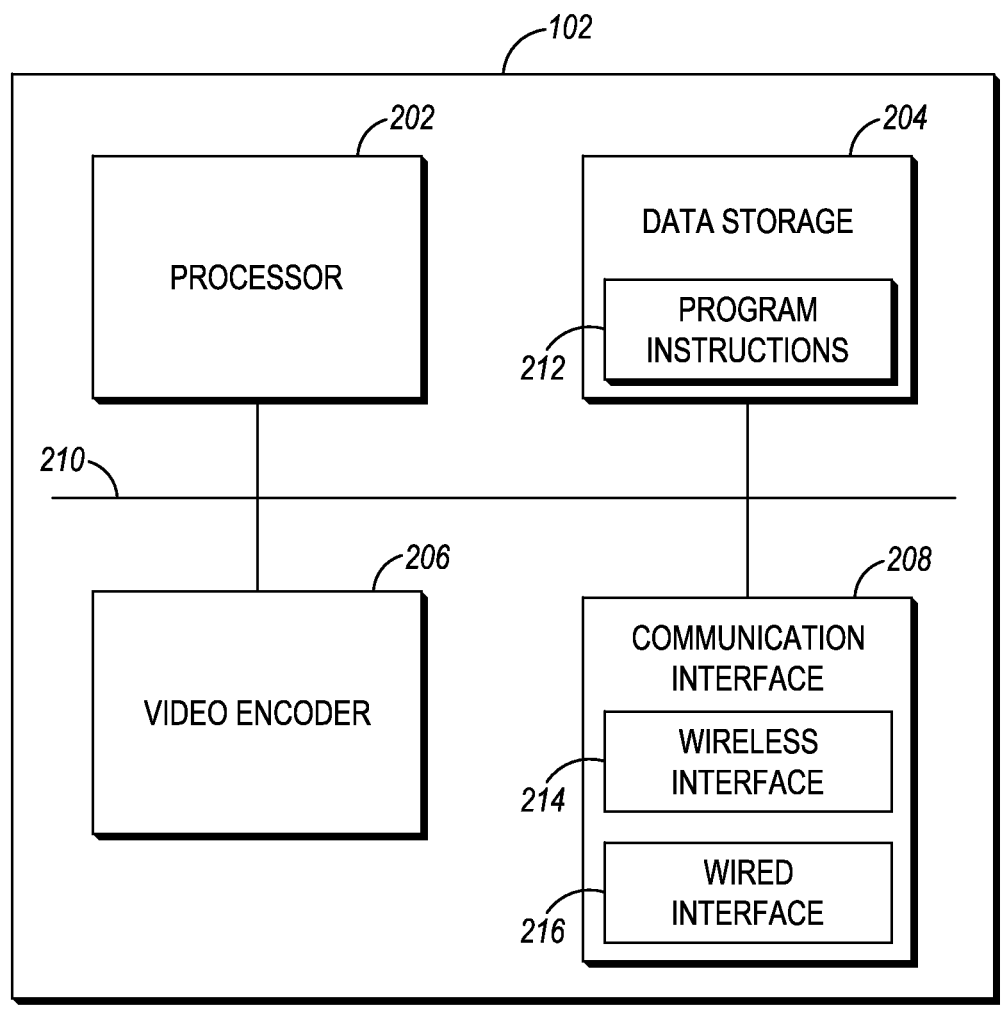
FIG. 2 depicts structural elements of a video source, in accordance with at least one embodiment.

FIG. 2 depicts structural elements of a video source, in accordance with at least one embodiment. As shown, video source 102 includes a processor 202, data storage 204, a video encoder 206, and a communication interface 208, each of which are interconnected via a system bus 210. Those having skill in the relevant art will appreciate that video source 102 could have additional and/or different components, and perhaps a different arrangement of components, among many other possible variations that could be listed here, and that one or more other network entities (e.g., receiving device 104) could take a form similar to that of video source 102.

Processor 202 may include one or more processors of any type deemed suitable by those of skill in the relevant art, some examples including a microprocessor and a dedicated digital signal processor (DSP).

Data storage 204 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 2, data storage 204 contains program instructions 212 executable by processor 202 for carrying out various functions, though data storage 204 may contain different and/or additional data such as one or more video frames of a video stream.

In an embodiment in which video source 102 is configured to carry out one or more processes and/or functions (such as the processes and functions described with reference to FIG. 4), program instructions 212 are executable by processor 202 for carrying out those functions. In instances where other entities described herein have a structure similar to that of the example video source 102 that is described in connection with at least FIG. 2, the respective program instructions 212 stored by the respective data storages 204 of those respective devices are executable by their respective processors 202 to carry out functions performed by those devices.

Video encoder 206 may be configured to encode one or more video frames (such as frames of a video stream) into one or more video formats such as MPEG-4 Part 10 (H.264), High Efficiency Video Coding (HEVC), MPEG-4 Part 2, and/or MPEG-2 video, among numerous other examples. Video source 102 could also include an audio encoder configured to convert an audio stream (e.g., an audio stream accompanying and/or associated with a video stream) into one more for audio formats such as PCM, Opus, and/or Advanced Audio Coding (AAC), among other audio formats that will be apparent to those of skill in the art.

In accordance with various video-encoding standards, video frames may be comprised of both intra-coded and inter-coded macroblocks. Decoding of intra-coded macroblocks is not dependent on the successful decoding of macroblock data from previous or future frames. An intra-coded frame is a video frame comprised entirely of intra-coded macroblocks. Decoding of inter-coded macroblocks is dependent on the successful decoding of macroblock data from previous or future frames. An inter-coded frame is a video frame composed of one or more inter-coded macroblocks and zero or more intra-coded macroblocks.

Communication interface 208 (including wireless-communication interface 214 and/or wired-communication interface 216) may include any necessary hardware (e.g., chipsets, antennas, Ethernet cards, etc.), any necessary firmware, and/or any necessary software for conducting one or more forms of communication with one or more other components and/or entities (such as a video-stream source, receiving device 104, and/or network 106).

Wireless-communication interface 214 may be configured to communicate according to one or more of the wireless-communication types and/or protocols mentioned above, and/or one or more other types and/or protocols deemed suitable by those having skill in the relevant art for a given implementation or in a given context. Similarly, wired-communication interface 216 may be configured to communicate according to one or more types and/or protocols such as Ethernet, USB, and the like, and/or one or more other types and/or protocols deemed suitable by those having skill in the relevant art for a given implementation or in a given context. Though communication interface 208 is depicted as including both a wireless-communication interface 214 and a wired-communication interface 216, those of skill in the art will appreciate that communication interface 208 may contain different and/or additional communication interfaces. For example, communication interface 208 could include only wireless-communication interface 214 (and not wired-communication interface 216), or vice versa. And other configurations are possible as well.

Figure 3:
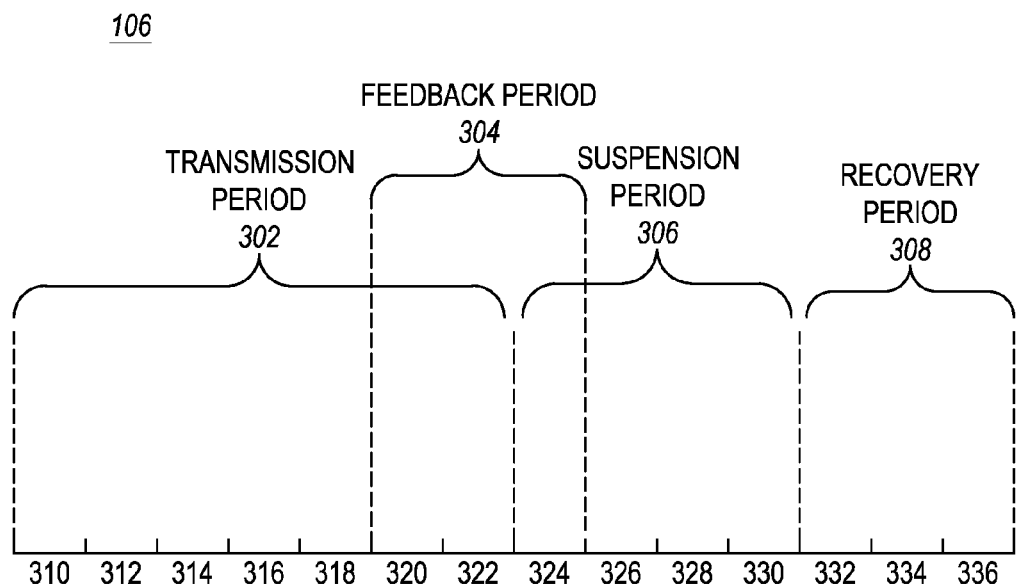
FIG. 3 depicts respective time periods of one or more air-interface time slots, in accordance with at least one embodiment.

FIG. 3 depicts respective time periods of one or more air-interface time slots, in accordance with at least one embodiment. Specifically, FIG. 3 depicts an example in which the half-duplex wireless link 106 of FIG. 1 includes a transmission period 302 of time slots 310-322, a feedback period 304 of time slots 320-324, a suspension period 306 of time slots 324-330, and a recovery period 308 of time slots 332-336. Different and/or additional time periods (such as one or more additional transmission periods) may be present. Various aspects of these time periods are discussed below and throughout this disclosure.

Figure 4:
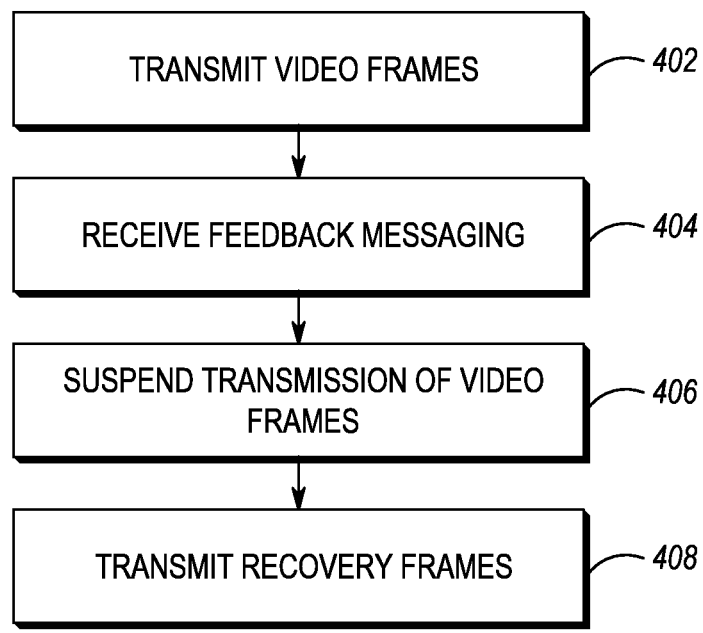
FIG. 4 depicts a flowchart of a process, in accordance with at least one embodiment.

FIG. 4 depicts a flowchart of a process, in accordance with at least one embodiment. As shown, process 400 begins at step 402 with video source 102 transmitting video frames to receiving device 104 during transmission period 302. At step 404, video source 102 receives feedback messaging from receiving device 104 during feedback period 304 and, at step 406 (after transmission period 302), suspends transmission of video frames for suspension period 306. At step 408, after feedback period 304 and suspension period 306, video source 102 transmits one or more recovery frames to receiving device 104 during recovery period 308.

In at least one embodiment, each video frame transmitted during transmission period 302 corresponds to video source 102 encoding a respective frame from a source video stream, and suspending transmission of the video frames for suspension period 306 includes video source 102 skipping encoding one or more frames from the source video stream.

Generally, the one or more recovery frames collectively take the form of (or include) (i) inter-coded macroblock data referencing data pertaining to a video frame transmitted during the first transmission period, and/or (ii) intra-coded macroblock data.

Figure 5:
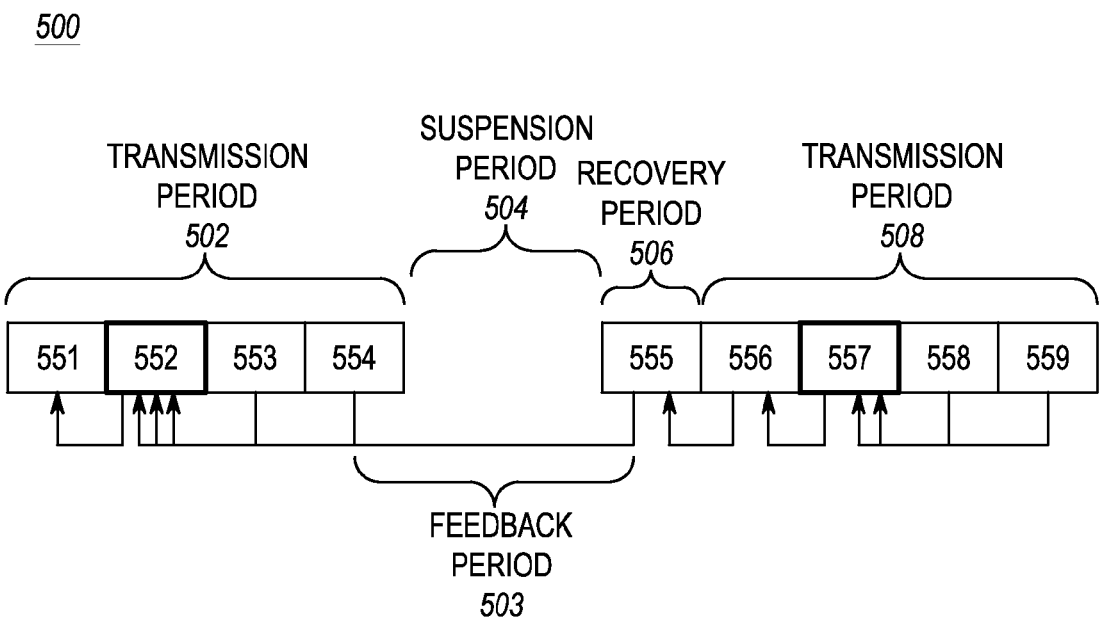
FIG. 5 depicts a first video stream, which has recovery frames that include inter-coded macroblock data, in accordance with at least one embodiment.

FIG. 5 depicts a first video stream, which has recovery frames that include inter-coded macroblock data, in accordance with at least one embodiment. A video stream 500 contains video frames 551-559, at least one of which takes the form of (or includes) a last-known good video frame 552. The arrows indicate which previously-transmitted video frames the inter-coded macroblock data (if any) of the respective frames is referencing.

In at least one embodiment, video source 102 (i) transmits video frames 551-554 during first transmission period 502 and (ii) stores last-known good video frame 552. The video source subsequently transmits recovery frame 555 to receiving device 104 during recovery period 506 (after suspension period 504). Recovery frame 555 includes inter-coded macroblock data referencing data pertaining to last-known good video frame 552 (which was transmitted during transmission period 502). As shown, video source 102 may transmit additional video frames 556-559 during second transmission period 508 following suspension period 506.

Video source 102 may transmit one or more pre-suspension video frames to receiving device 104 after storing last-known good video frame 552 but before suspending transmission of video frames for suspension period 504. In the embodiment illustrated in FIG. 5, each of pre-suspension video frames 553-554 references last-known good video frame 552. In other embodiments, each of pre-suspension video frames 553-554 references the video frame immediately preceding the respective pre-suspension video frame (in addition to and/or instead of referencing last-known good video frame 552).

Figure 6:
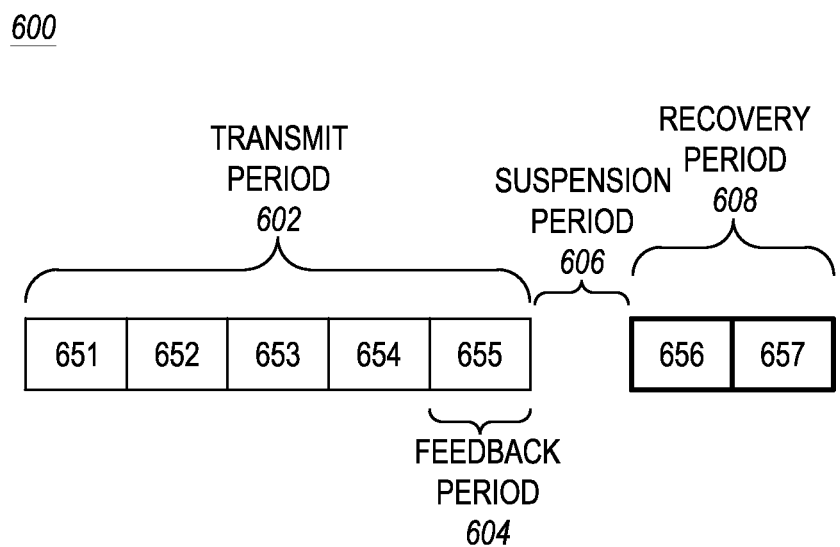
FIG. 6 depicts a second video stream, which has recovery frames that include intra-coded macroblock data, in accordance with at least one embodiment.

FIG. 6 depicts a second video stream, which has recovery frames that include intra-coded macroblock data, in accordance with at least one embodiment. A video stream 600 contains video frames 651-657, including recovery frames 656-657 that each include intra-coded macroblock data. Video source 102 transmits video frames 651-655 to receiving device 104 during transmission period 602. Video source 102 receives feedback messaging from receiving device 104 during feedback period 604. After transmission period 602, video source 102 suspends further transmission of any video frames for suspension period 606. After feedback period 604 and suspension period 606, video source 102 transmits recovery frames 656-657 (each including intra-coded macroblock data) to receiving device 104 during recovery period 608.

Figure 7:
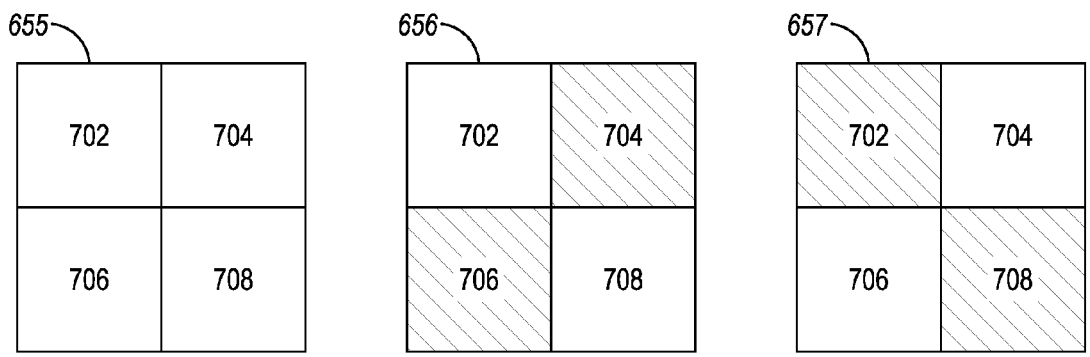
FIG. 7 depicts macroblocks of video frames of the video stream of FIG. 6, in accordance with at least one embodiment.

FIG. 7 depicts macroblocks of video frames of the video stream of FIG. 6, in accordance with at least one embodiment. In at least one embodiment, each of recovery frames 656-657 of FIG. 6 contains respective different intra-macroblock encoded regions, as depicted in FIG. 7. As shown, each of video frames 655-657 are divided into four macroblock regions 702-708. Macroblock regions 704 and 706 of video frame 656 and macroblock regions 702 and 708 of video frame 657 take the form of respective intra-coded macroblocks (as represented by the hatching of these macroblocks). Recovery frame 656 contains intra-macroblock encoded regions 704 and 706, which are respectively different intra-macroblock encoded regions from intra-macroblock encoded regions 702 and 708 of recovery frame 657. Those skilled in the art will appreciate that other configurations of intra-coded macroblock data groupings are possible; e.g., other sequences, permutations, and the like are possible for providing intra-coded macroblock data for various macroblocks over contiguous and/or non-contiguous sequences of video frames.

In at least one other embodiment, the one or more recovery frames consist of a single intra-coded video frame. All or less than all of the macroblocks of the recovery frame could take the form of intra-macroblock encoded regions.

In at least one embodiment, the feedback messaging received from the receiving device during the feedback period is synchronous feedback messaging. Synchronous feedback messaging is any messaging that occurs at periodic intervals. In these instances, the feedback period is scheduled to occur after the transmission period and during the suspension period. For example, in the embodiment illustrated in FIG. 5, feedback period 503 occurs after transmission period 502 and during suspension period 504. The synchronous feedback messaging could take the form of (or include) one or more ABR feedback messages (e.g., real-time control protocol (RTCP) messaging) and/or one or more session keep-alive messages (e.g., real-time streaming protocol (RTSP) messaging). Those of skill in the art will appreciate that the synchronous feedback messaging could take other forms. In one embodiment, the video source schedules the periodic intervals during which synchronous feedback messaging occurs. In other embodiments, other operatively coupled system elements may facilitate scheduling of the periodic intervals. In any case, the scheduling function may advertise an upcoming periodic feedback interval to receiving devices by way of signaling embedded in the video stream, as one example implementation.

In at least one embodiment, the feedback messaging is asynchronous feedback messaging and the feedback period is unscheduled. Asynchronous feedback messaging is any feedback messaging that occurs at non-periodic intervals. The unscheduled feedback period may occur during and/or after the first transmission period. For example, as shown in FIG. 3, feedback period 304 occurs both during and after transmission period 302. The asynchronous feedback messaging could take the form of (or include) one or more PTZ commands, among numerous other possibilities. In at least one embodiment, the unscheduled feedback period occurs during the transmission period, and suspending transmission of video frames for the suspension period includes suspending transmission of video frames for the suspension period in response to receiving the asynchronous feedback messaging from the receiving device. And certainly other implementations are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    transmitting video frames to a receiving device during a first transmission period of one or more time slots of a half-duplex air interface;
    receiving feedback messaging from the receiving device during a feedback period of one or more time slots of the half-duplex air interface;
    after the first transmission period, suspending transmission of video frames for a suspension period of one or more time slots of the half-duplex air interface; and
    after the feedback period and after the suspension period, transmitting one or more recovery frames to the receiving device during a recovery period of one or more time slots of the half-duplex air interface,
    wherein the one or more recovery frames collectively comprise one or both of (i) inter-coded macroblock data referencing data pertaining to a video frame transmitted during the first transmission period and (ii) intra-coded macroblock data.

2. The method of claim 1, wherein the feedback messaging is asynchronous feedback messaging, wherein the feedback period is unscheduled.

3. The method of claim 2, wherein the asynchronous feedback messaging comprises one or more pan-tilt-zoom (PTZ) commands.

4. The method of claim 2, wherein the feedback period occurs during the first transmission period.

5. The method of claim 4, wherein suspending transmission of video frames for the suspension period comprises suspending transmission of video frames for the suspension period in response to receiving the feedback messaging from the receiving device during the feedback period.

6. The method of claim 2, wherein the feedback period occurs after the first transmission period.

7. The method of claim 1, wherein the feedback messaging is synchronous feedback messaging, wherein the feedback period is scheduled to occur after the first transmission period and during the suspension period.

8. The method of claim 7, wherein the synchronous feedback messaging comprises one or more adaptive bit rate (ABR) feedback messages.

9. The method of claim 7, wherein the synchronous feedback messaging comprises one or more session keep-alive messages.

10. The method of claim 7, wherein a schedule of the feedback period is advertised to receiving devices.

11. The method of claim 1, wherein:
    each video frame transmitted during the first transmission period corresponds to encoding a respective frame from a source video stream, and
    suspending transmission of video frames for the suspension period comprises skipping encoding one or more frames from the source video stream.

12. The method of claim 1, wherein the one or more recovery frames collectively comprise inter-coded macroblock data referencing data pertaining to one or more of the video frames transmitted during the first transmission period.

13. The method of claim 12, further comprising:
    storing a last-known good video frame from among the video frames transmitted to the receiving device during the first transmission period, wherein the reference data pertaining to one or more of the video frames transmitted during the first transmission period comprises reference data pertaining to the last-known good video frame.

14. The method of claim 13, further comprising transmitting one or more pre-suspension video frames to the receiving device after storing the last-known good video frame but before suspending transmission of video frames for the suspension period.

15. The method of claim 14, wherein each of the one or more pre-suspension video frames references a respective immediately preceding video frame.

16. The method of claim 14, wherein each of the one or more pre-suspension video frames references the last-known good video frame.

17. The method of claim 1, wherein the one or more recovery frames collectively comprise intra-coded macroblock data.

18. The method of claim 17, wherein the one or more recovery frames consist of a single intra-coded video frame.

19. The method of claim 17, wherein the one or more recovery frames comprise multiple recovery frames that include respective different intra-macroblock encoded regions.

20. A system comprising:
a video encoder;
a communication interface;
a processor; and
data storage containing instructions executable by the processor for causing the system to carry out a set of functions, the set of functions including:
   transmitting video frames to a receiving device during a first transmission period of one or more time slots of a half-duplex air interface;
   receiving feedback messaging from the receiving device during a feedback period of one or more time slots of the half-duplex air interface;
   after the first transmission period, suspending transmission of video frames for a suspension period of one or more time slots of the half-duplex air interface; and
   after the feedback period and after the suspension period, transmitting one or more recovery frames to the receiving device during a recovery period of one or more time slots of the half-duplex air interface,
wherein the one or more recovery frames collectively comprise one or both of (i) inter-coded macroblock data referencing data pertaining to one or more of the video frames transmitted during the first transmission period and (ii) intra-coded macroblock data.

* * * * *